United States Patent
Galsim et al.

(10) Patent No.: US 9,041,247 B2
(45) Date of Patent: May 26, 2015

(54) METHOD AND APPARATUS FOR CONTROLLING DISTRIBUTION OF POWER

(75) Inventors: Marlon Galsim, Pangasinan (PH); Jinsong Lee, Jiangsu (CN); Ray Shen, Zhonghe (TW); Xuetao Liu, Jiangsu (CN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 635 days.

(21) Appl. No.: 13/111,173

(22) Filed: May 19, 2011

(65) Prior Publication Data

US 2011/0254371 A1    Oct. 20, 2011

Related U.S. Application Data

(63) Continuation of application No. PCT/CN2008/073141, filed on Nov. 21, 2008.

(51) Int. Cl.
| | |
|---|---|
| *H01R 24/30* | (2011.01) |
| *H02J 9/00* | (2006.01) |
| *G06F 1/26* | (2006.01) |
| *H01R 24/78* | (2011.01) |
| *H01R 25/00* | (2006.01) |
| *H02J 3/14* | (2006.01) |

(Continued)

(52) U.S. Cl.
CPC ............... *H02J 9/005* (2013.01); *G06F 1/263* (2013.01); *G06F 2200/261* (2013.01); *H01R 13/6666* (2013.01); *H01R 13/6683* (2013.01); *H01R 13/70* (2013.01); *H01R 13/7175* (2013.01); *H01R 24/30* (2013.01); *H01R 24/78* (2013.01); *H01R 25/003* (2013.01); *H01R 2103/00* (2013.01); *H02J 3/14* (2013.01); *Y02B 70/3225* (2013.01); *Y02B 70/3233* (2013.01); *Y02B 90/226* (2013.01); *Y04S 20/16* (2013.01); *Y04S 20/222* (2013.01); *Y04S 20/225* (2013.01); *Y02B 60/1296* (2013.01)

(58) Field of Classification Search
USPC .......................................... 307/39
See application file for complete search history.

(56) References Cited

U.S. PATENT DOCUMENTS

| | | | |
|---|---|---|---|
| 7,977,825 B2 * | 7/2011 | Gilbert ........................... | 307/131 |
| 2002/0185916 A1 * | 12/2002 | Barton et al. .................. | 307/38 |

(Continued)

FOREIGN PATENT DOCUMENTS

| | | |
|---|---|---|
| CN | 2850053 Y | 12/2006 |
| CN | 200987067 Y | 12/2007 |

(Continued)

OTHER PUBLICATIONS

Extended European Search Report for European Appllication No. 08878213.1 dated Jun. 15, 2012.

(Continued)

*Primary Examiner* — Rexford Barnie
*Assistant Examiner* — Daniel Kessie
(74) *Attorney, Agent, or Firm* — Lando & Anastasi, LLP (57) ABSTRACT

Aspects of the invention are directed to apparatus and methods for controlling power distribution to a plurality of devices including a primary device and at least one secondary device, the primary device having at least a first mode of operation and a second mode of operation, with the second mode of operation being a lower power mode of operation than the first mode of operation.

19 Claims, 3 Drawing Sheets

(51) Int. Cl.
  *H01R 13/66* (2006.01)
  *H01R 13/70* (2006.01)
  *H01R 13/717* (2006.01)
  *H01R 103/00* (2006.01)

(56) References Cited

U.S. PATENT DOCUMENTS

| | | | |
|---|---|---|---|
| 2007/0038334 A1* | 2/2007 | Chou et al. | 700/292 |
| 2009/0307505 A1 | 12/2009 | Robertson et al. | |
| 2012/0201062 A1* | 8/2012 | Lee | 363/84 |

FOREIGN PATENT DOCUMENTS

| | | |
|---|---|---|
| CN | 101243375 A | 8/2008 |
| CN | 101281394 A | 10/2008 |
| DE | 10 2006 053280 A1 | 5/2008 |
| EP | 2 184 816 A1 | 5/2010 |
| KR | 10-009-0103656 * | 10/2009 |
| WO | 2006136812 A1 | 12/2006 |

OTHER PUBLICATIONS

International Search Report for PCT/CN2008/073141 mailed Aug. 27, 2009.

* cited by examiner

METHOD AND APPARATUS FOR CONTROLLING DISTRIBUTION OF POWER

RELATED APPLICATIONS

This application is a continuation of International Patent Application Serial No. PCT/CN2008/073141, filed Nov. 21, 2008, which is herein incorporated by reference in its entirety for all purposes.

BACKGROUND OF INVENTION

1. Field of Invention

Embodiments of the present disclosure relate generally to methods and systems for analyzing and managing distribution of power to multiple devices from a common power source.

2. Discussion of Related Art

Some home and office equipment manufacturers have implemented stand-by power saving technology in their products. In accordance with this technology, home and office equipment that consumes electrical power may automatically transfer to a stand-by power saving mode when not used for a period of time, thus reducing overall power consumption. Some television sets and personal computers utilize this stand-by power saving mode, but many peripherals such as computer monitors, DVD players, audio amplifiers, printers, scanners, and handheld device battery chargers are not typically configured to enter a stand-by or sleep mode upon periods of non-use, and thus may consume considerable amounts of energy even when not in use.

Several solutions to disable power to peripherals under certain conditions exist currently in the market. Such example includes surge protectors that offer "master" and "controlled" outlets. The CPU of a computer, a television, or a receiver of an audio/video (A/V) system is plugged into the "master" or "primary" outlet. The system peripherals are connected to the "controlled" or "secondary" outlets. When the device plugged into the "master" outlet goes into stand-by power mode, as determined by the current drawn by the "master" device falling below a factory pre-set current set point, the "controlled" outlets are turned off, thereby reducing energy consumption by cutting power to these peripherals which otherwise may continue to use power even though not in use.

SUMMARY OF THE INVENTION

At least some embodiments of the present invention are directed to methods and systems for providing stand-by power savings, and in particular to methods and systems for determining a stand-by power level of a master device and controlling power distribution to controlled devices responsive to the power demand of the master device.

Features of at least some embodiments of devices and methods according to the present invention enable the user to "teach" a smart power strip how to determine when a particular master device has gone into stand-by mode. Such a power-saving smart power strip may be compatible with any system having master and controlled devices.

In accordance with one embodiment of the invention there is provided apparatus for controlling application of power to a plurality of devices including a master device and at least one controlled device. The apparatus comprises a power inlet constructed and arranged to receive power from a power source, a plurality of power outlets including a master power outlet and at least one controlled power outlet, a first circuit adapted to sense a characteristic of power delivered to the master power outlet, a second circuit adapted to determine a characteristic of a stand-by power consumption level of a device electrically connected to the master power outlet, a third circuit adapted to compare the characteristic of power delivered to the master power outlet sensed by the first circuit with the characteristic of the stand-by power consumption level determined by the second circuit, and a fourth circuit adapted to control a supply of power from the power inlet to the at least one controlled outlet responsive to the comparison performed by the third circuit.

According to one or more aspects of the invention, the characteristic of power delivered to the master power outlet sensed by the first circuit is current, and according to one or more aspects, the characteristic of power delivered to the master power outlet sensed by the first circuit further comprises voltage.

According to at least one aspect of the invention, the characteristic of the stand-by power consumption level determined by the second circuit is total power, and according to at least one aspect, the characteristic of the stand-by power consumption level determined by the second circuit is current.

According to an aspect of the invention, the apparatus further comprises a plurality of master power outlets, wherein the first circuit is adapted to sense a characteristic of power delivered to each of the plurality of master power outlets, wherein the second circuit is adapted to determine a characteristic of a stand-by power consumption of devices electrically connected to each of the plurality of master power outlets, wherein the third circuit is adapted to compare the characteristic of power delivered to each of the plurality of master power outlets sensed by the first circuit with the characteristic of the stand-by power consumption determined by the second circuit, and wherein the fourth circuit is adapted to control the supply of power from the power inlet to the at least one controlled outlet responsive to the comparison performed by the third circuit.

According to an aspect of the invention, the apparatus further comprises a non-volatile memory configured to store a representation of the stand-by power consumption level.

According to an aspect of the invention, the apparatus further comprises an uninterruptable power supply.

According to an aspect of the invention, the apparatus further comprises a controller and an indicator coupled to the controller and controlled by the controller to provide an indication of a stand-by power consumption level test being performed.

According to an aspect of the invention, the apparatus further comprises a controller and an indicator coupled to the controller and controlled by the controller to provide an indication of a stand-by power consumption level test being completed.

In accordance with another embodiment of the invention there is provided a method of controlling power distribution to a plurality of devices including a master device and at least one controlled device, the master device having at least a first mode of operation and a second mode of operation, with the second mode of operation being a lower power mode of operation than the first mode of operation. The method comprises providing power to the master device through a primary outlet, sensing at least one characteristic of the power provided through the primary outlet with the master device in the second mode of operation, setting a first threshold characteristic of the power provided through the primary outlet based on the sensed characteristic of the power provided through the primary outlet, providing power to the at least one controlled device through a secondary outlet, measuring an operating characteristic of power provided through the primary outlet, and controlling power to the at least one controlled device responsive to the measured operating characteristic of power provided through the primary outlet.

According to at least one aspect of the method, sensing the at least one characteristic of power provided through the primary outlet with the master device in the second mode of operation is initiated manually, and according to at least one aspect of the method, sensing the at least one characteristic of power provided through the primary outlet with the master device in the second mode of operation is initiated automatically.

According to at least one aspect of the invention, the method further comprises providing an indication that the master device is operating in the second mode of operation.

According to at least one aspect of the invention, the method further comprises removing power to the at least one controlled device responsive to the operating characteristic of power provided through the primary outlet being at least one of the same as or less than the first threshold characteristic of the power provided through the primary outlet.

According to at least one aspect of the invention, the method further comprises setting a second threshold characteristic of power provided through the primary outlet based on the sensed characteristic of the power provided through the primary outlet, and according to at least one aspect of the invention, the method further comprises providing power to the at least one controlled device responsive to the operating characteristic of power provided through the primary outlet being greater than the second threshold characteristic of the power provided through the primary outlet.

According to at least one aspect of the invention, the method further comprises replacing the master device with a second master device, the second master device having at least a first mode of operation and a second mode of operation, providing power to the second master device through a primary outlet, sensing at least one characteristic of the power provided through the primary outlet with the second master device in the second mode of operation, and setting a third threshold characteristic of the power provided through the primary outlet based on the sensed at least one characteristic of the power provided through the primary outlet.

According to an aspect of the invention, sensing the at least one characteristic of the power provided through the primary outlet with the second master device in the second mode of operation is initiated manually, and according to at least one aspect of the invention, sensing the at least one characteristic of the power provided through the primary outlet with the second master device in the second mode of operation is initiated automatically.

In accordance with another embodiment of the invention, there is provided an apparatus for controlling application of power to a plurality of devices including a master device and at least one controlled device. The apparatus comprises a power inlet constructed and arranged to receive power from a power source, a plurality of power outlets including a master power outlet and at least one controlled power outlet, and means for determining a characteristic of a stand-by power consumption level of a master device electrically connected to the master power outlet and controlling a supply of power from the power inlet to the at least one controlled power outlet responsive to a comparison of a characteristic of power delivered to the master device with the characteristic of the stand-by power consumption level of the master device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the present disclosure the terms "master" and "primary" device or outlet are used interchangeably, as well as are the terms "controlled" and "secondary" device or outlet.

At least one embodiment of the invention is directed to an apparatus for controlling power to, for example, computer equipment and/or A/V equipment. For personal computer equipment, the power level consumed by a CPU in a stand-by power mode is in general consistent and standard. For A/V equipment, however, stand-by power consumption levels can vary significantly from one device and/or manufacturer to another. Thus, a smart power strip designed to monitor power consumption of a master A/V device, such as a television, and determine whether the device is in an active or a stand-by state by comparing the device power consumption with a predetermined power consumption set point may not "know" when an A/V component having a different stand-by power consumption level is truly in a stand-by state.

A smart stand-by power tracking (SSPT) master/controlled device power controller according to at least one embodiment of the present invention does not have a pre-defined consumption set point for determining a stand-by state of a master device. The stand-by power consumption level of a master device that is to be connected to a master power outlet of the device power controller is not defined in the controller prior to the controller being initialized to work with a particular master device. A user may manually activate the master/controlled device power controller to track and measure the stand-by power of a connected master device, and the power controller will store the measured data to a memory, such as an EEPROM memory, to be used as a reference point for master device stand-by mode detection. In some embodiments, the measured data may be used to define at least one of a controlled device activation and a controlled device deactivation power consumption trigger level. These activation and deactivation power consumption trigger levels (set points) may, but not necessarily need be the same. In some embodiments, successful completion of the master device stand-by power tracking is communicated to a user by an indicator, such as an LED.

If a user changes a master device connected to the device power controller and the new master device has a different stand-by power consumption level than the previous master device, the user may manually re-initiate the master/controlled device power controller which will then track the stand-by power of the new master and replace the stored reference data of the previous master device. At least one embodiment of the present invention provides a universal solution for a power saving smart power strip compatible with any master device that has a stand-by power saving mode.

Figure 1:
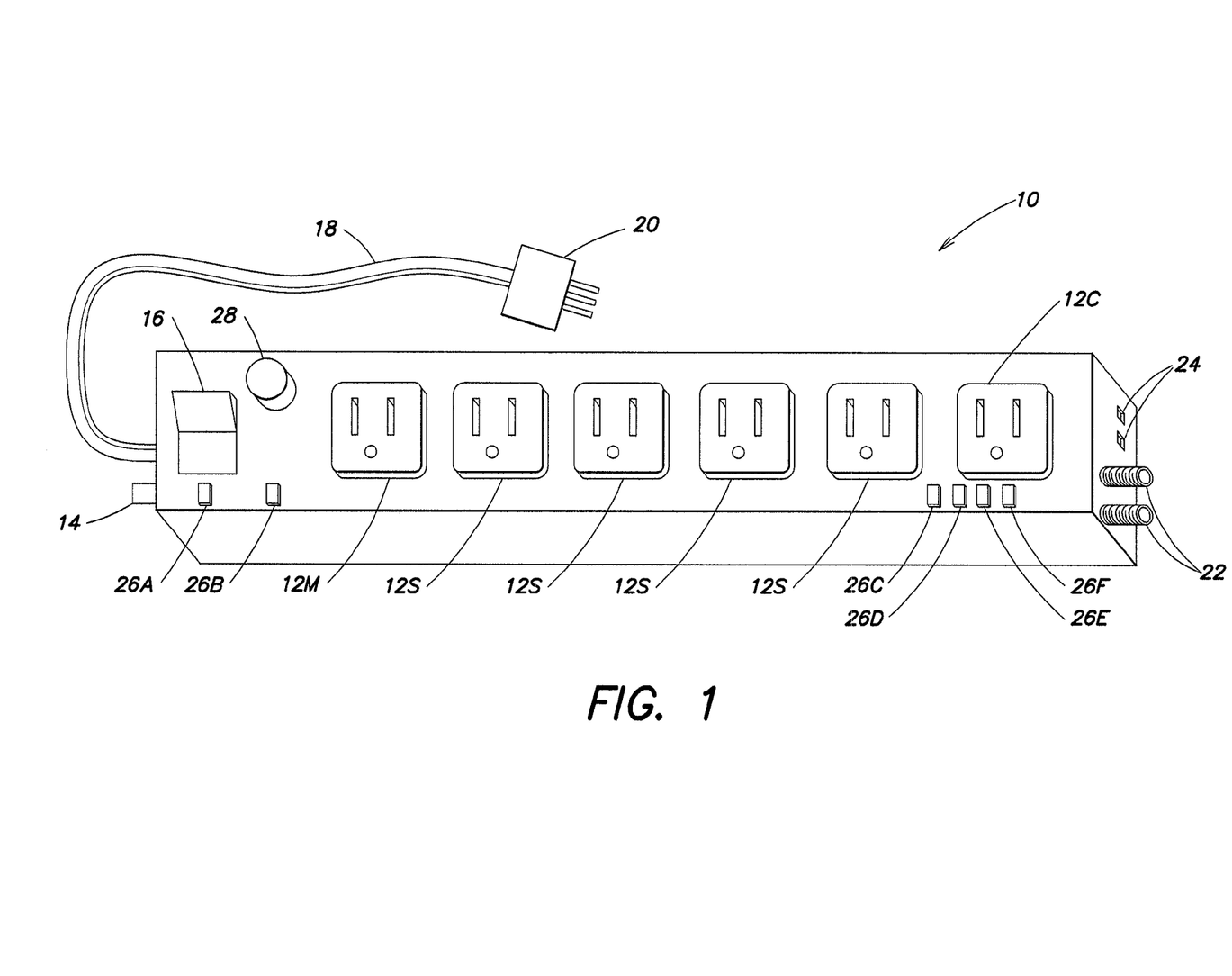
FIG. 1 is power strip according to an embodiment of the present invention.

Illustrated in FIG. 1 is a power strip 10 in accordance with one embodiment of the smart stand-by power tracking technology of the present invention. Power strip 10 has one master device outlet 12M, and four controlled device outlets 12S. Power to controlled device outlets 12S is disrupted in response to a device plugged into the master outlet 12M entering a stand-by mode or sleep state. Power outlet 10 also includes a constant power outlet 12C, which may be utilized for connecting a device to which a user desires power to be delivered regardless of the status of a device plugged into the master outlet 12M.

Power strip 10 includes an internal circuit breaker, EMI filter/surge protector, and ground fault detector (not shown). Power strip 10 includes a power reset switch 14 in addition to a main power switch 16. Power reset switch 14 may be utilized to restore power to the outlets of the power strip if the power is discontinued by, for example, the circuit breaker or ground fault detector. Power strip 10 also includes a power inlet, comprising power cord 18 and plug 20, for plugging into an external source of power to receive power and supply power to the power strip.

Power strip 10 also includes connections for coaxial cables 22 and/or telephone lines 24 to enable signals travelling along a connected coaxial cable and/or telephone line to be routed through the internal EMI filter/surge protector to provide protection to these lines.

Power strip 10 includes indicators 26A-26F which comprise LEDs, although other suitable light emitting devices or indicators may be present in alternate embodiments. Indicators 26A-26F are used to indicate various operating conditions of power strip 10, including the condition that power is being supplied to the power strip, that power is being supplied to the master and/or controlled device outlets, that a fault condition exists, that a stand-by power level set point of a master outlet has been met or exceeded, and that a stand-by power test is being performed or has been completed. In alternate embodiments, more or fewer indicators may be present and one or more of these indicators may indicate other operating conditions as will be explained further below.

Power strip 10 also includes a stand-by power tracking enable switch 28, whose function will be discussed further below.

In other embodiments, power strip 10 includes a plurality of master outlets 12M, at least one controlled device outlet 12S, and optionally, one or more constant power outlets 12C. In some embodiments where there is more than one master outlet, for example two master outlets, the controlled device outlet(s) are deactivated in response to a device connected to either of the master outlets entering a stand-by mode. In other embodiments where there is more than one master outlet, for example two master outlets, the controlled device outlet(s) are deactivated in response to devices connected to each of the master outlets entering stand-by modes. In some aspects, under the condition that each of two master devices has entered stand-by mode, and the controlled device outlet or outlets have been deactivated, the controlled device outlet(s) may be reactivated in response to either one or both of the master devices re-entering active versus stand-by mode. The master power consumption set points for activation and deactivation of the controlled outlets(s) may be the same or may be different for each of the master outlets.

Alternate embodiments of power strip 10 may include additional features or elements, or may lack one or more of the elements described above, such as an internal circuit breaker, EMI filter/surge protector, ground fault detector, constant power outlet(s), and coaxial cable or telephone line connections.

Figure 2:
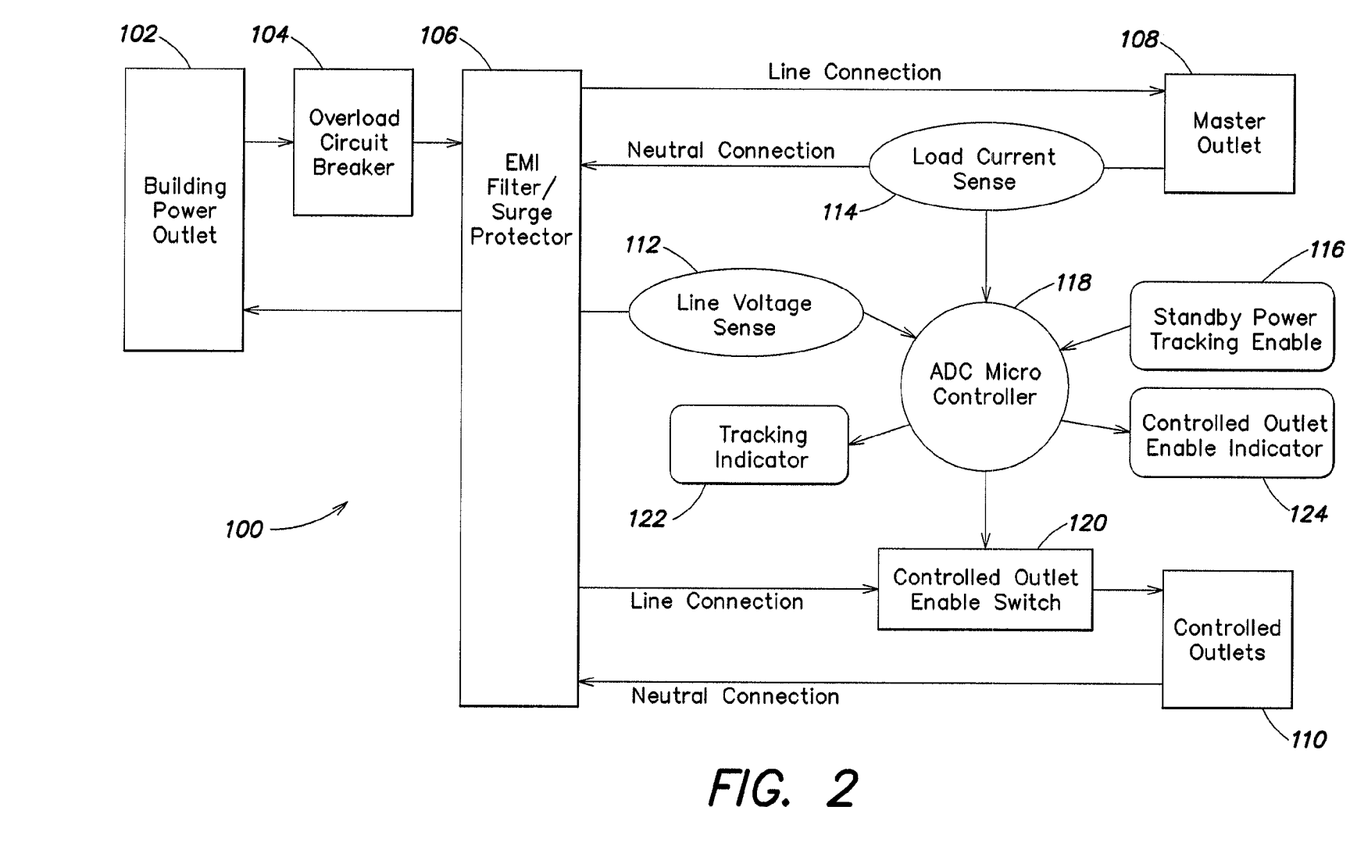
FIG. 2 is a block diagram of a smart stand-by power tracking master/controlled device controller according to an embodiment of the present invention.

FIG. 2 is a functional block diagram of a smart stand-by power tracking system (SSPT) 100 included in power strip 10. SSPT 100 controls the power delivered to controlled outlets of power strip 10 in response to a total amount of power delivered to a master device through a master outlet. SSPT 100 discontinues the power delivered to the controlled outlets of power strip 10 when a characteristic of the power delivered to the master outlet falls below a first set point defined by the master device stand-by mode power consumption. SSPT 100 re-enables power delivery to controlled power outlets whose power has been discontinued when a characteristic of the power delivered to the master outlet rises above a second set point defined by the master device stand-by mode power consumption.

The power delivered to the master device is a product of the current and the voltage delivered to the master device (Power (Watts)=Voltage (Volts)×Current (Amps)). SSPT 100 monitors both the line voltage and the actual current delivered to a connected master device and computes a total power consumption of the connected master device, as will be described further below. This is desirable when a connected master has a stand-by or sleep mode which draws a defined amount of power. If a defined amount of power is consumed in stand-by mode, measuring the current delivered to the master device alone would not be a true measure of power consumption if the line voltage were to change. For example, if a set amount of power was consumed by a master device in stand-by mode, and the line voltage dropped by 50%, then ideally, the current drawn by the master device in stand-by mode would double.

SSPT 100 sets a stand-by mode detection set point for the master device based on a measure of total power delivered to the master in stand-by mode rather than current delivered to the master in stand-by mode. This is because a stand-by mode detection set point based solely on current delivered to a master device in stand-by mode may not be desirable for master devices configured to consume a specific amount of power, as opposed to, for example, a specific amount of current in stand-by mode for the reasons described above.

In alternate embodiments, however, SSPT 100 may measure just the current delivered to a connected master device, and in some embodiments SSPT 100 may be configured by a user to measure either the current or the power delivered to a master device, or both.

Block 102 of FIG. 2 represents a source of power for SSPT 100. This source of power is in one embodiment single phase 120 Volt 60 Hz utility power, but in other embodiments may be three-phase power, single phase power having a different voltage and/or frequency, or power from an uninterruptable power supply unit. Power entering SSPT 100 passes through an overload circuit breaker 104. This circuit breaker is configured to discontinue power to all connected devices during abnormal load and/or short circuit. SSPT 100 also includes EMI filter/surge protector circuit 106 electrically connected to an output of overload circuit breaker 104. The EMI Filter/surge protector circuit 106 eliminates unwanted electrical "noise" that might interfere with A/V signals that may be delivered to devices connected to SSPT 100, thus facilitating high fidelity sound and better picture quality in connected A/V products. Some A/V devices are very sensitive to power surges such as those associated with lightning strikes, so EMI filter/surge protector circuit 106 is configured to clamp incoming voltage surges that are generated by lightning strikes across the distribution power lines. For example, an incoming power surge of 6,000 V generated by a lightning strike would be clamped down by the EMI filter/surge protector circuit 106 to less than about 330 V, rendering it harmless to connected A/V equipment. EMI filter/surge protector circuit 106 is also utilized to remove noise and protect against power surges in coaxial cables or telephone lines connected to power strip 10.

Master outlet 108 of SSPT 100 is electrically connected to an output of EMI filter/surge protector circuit 106 and provides filtered and surge-protected AC power. Equipment or devices which have a stand-by power saving feature can be connected to this outlet. A non-exhaustive list of master device types that may be connected to master outlet 108 includes television sets, personal computers (PCs), and A/V receivers and/or controllers. The SSPT 100 constantly checks for a tracking command from the user to measure the stand-by power of this outlet.

Master-controlled peripherals (secondary devices) may be connected to controlled device outlets 110. In one embodiment, these outlets correspond to outlets 12S of power strip 10. These outlets draw power from an electrical connection to EMI filter/surge protector circuit 106 by way of a controlled outlet enable switch 120, which is discussed below. The type of controlled equipment connected to controlled device outlets 110 may depend on the functionality of the master device connected to master outlet 108. For example, if the master device is a television (TV) set, a non-exhaustive list of possible controlled devices may include DVD/VCD players, VCRs, set-up boxes, and/or satellite receivers. As the master device (the TV set) enters power-saving stand-by mode, the peripherals may be idle but still consuming power. The SSPT power controller constantly monitors master outlet 108 in order to detect the master device's power saving mode transition, and upon this transition shuts down idle controlled peripherals so that they will not consume power.

SSPT 100 includes a standby power tracking enable switch (SPTE) 116 which is utilized to initiate an algorithm to measure a power consumption associated with a master device stand-by state. SPTE 116 is in one embodiment a momentarily-on push button switch which is electrically connected to microcontroller 118 via an analog to digital converter (not shown). In one embodiment, SPTE 116 corresponds to button 28 as illustrated on power strip 10. During initial operation of power strip 10, SSPT 110 assumes an idle state, constantly monitoring the state of SPTE 116. The user may initialize SSPT 100 by initiating stand-by power saving mode in a master device connected to a master outlet 108 and then instructing SSPT 100 to perform a power consumption tracking algorithm. With the master device in stand-by power saving mode, a user may momentarily activate SPTE 116 to command the microcontroller 118 of SSPT 100 to track and measure the stand-by power of the master and calculate a power consumption level of the connected master indicative of the master being in a stand-by power saving state. A representation of a characteristic of the measured stand-by power consumption level, such as total power drawn, is stored and used as a reference for controlled device power control. Every time a user changes the connected master equipment or device, the user may re-initialize SPTE 116 to replace the stand-by power consumption reference point of the previous master device.

SSPT 100 further comprises a master load current sensor circuit 114 which is electrically connected between an outlet of EMI filter/surge protector circuit 106 and a terminal of master outlet 108. Master load current sensor circuit 114 generates an electrical current sense signal based on the current draw of a master device connected to the master outlet. This electrical current sense signal is measured by microcontroller 118 after analog to digital conversion. In some embodiments, a representation of the measured master electrical current signal is stored in the microcontroller memory for reference by the microcontroller.

SSPT 100 includes a line voltage sensor circuit 112 in electrical communication with EMI filter/surge protector circuit 106 which generates a voltage sense signal based on the voltage provided by the EMI filter/surge protector circuit 106. The voltage level supplied by EMI filter/surge protector circuit 106 is common to the master and controlled device outlets. This voltage sense signal is measured by microcontroller 118 after analog to digital conversion. In some embodiments, a representation of the measured voltage signal is stored in the microcontroller memory for reference by the microcontroller.

Microcontroller 118 includes an internal analog to digital converter and EEPROM data memory. Microcontroller 118 may be any of a number of commercially available microcontrollers, for example, a PIC12F675 8-bit CMOS microcontroller, available from Microchip Technologies of 2355 West Chandler Blvd., Chandler, Ariz. After the activation of SPTE 116 and in some aspects, the signal conditioning of the master device's stand-by power, the microcontroller 118 processes the voltage and current sense signals supplied by voltage sensor circuit 112 and current sensor circuit 114, respectively, and stores the data in memory. The voltage and current sense signals are further processed by microcontroller 118 to obtain a measurement of the master device stand-by power consumption. The calculated master device stand-by power consumption is stored in the EEPROM to be used as a reference point for controlled device power control.

Controlled device enable switch 120 comprises a relay that is configured to be enabled and/or disabled by the microcontroller. Controlled device enable switch 120 completes a circuit from EMI filter/surge protector circuit 116 to supply power to the controlled device outlet or outlets 110 when enabled. The microcontroller is configured to close a relay of controlled device enable switch 120 when a connected master device is operational (when the master device power consumption is higher than the stored stand-by power consumption reference point), thus providing power from the power inlet of power strip 10 to the controlled device outlets 110. The microcontroller is configured open the relay if the master is in stand-by power saving mode, thus disabling the flow of power going to the controlled device outlets 110 and eliminating the idle power consumption of the controlled devices. In some aspects, controlled device enable switch 120 may comprise a solid state device such as a power transistor, rather than a relay.

Tracking indicator 122 is an LED indicator which provides confirmation of the SSPT setup. Tracking indicator 122 corresponds to indicator lamp 26B of power strip 10. This LED is deactivated unless and until the user activates the SPTE switch 116. In other embodiments, other indicators may additionally or alternatively be used, such as an audio indicator.

Controlled device enable indicator 124 is a microcontroller-controlled LED indicator which assumes one state during normal master operation and assumes a second state when a connected master device is in stand-by mode. In one embodiment, controlled device enable indicator 124 corresponds to indicator lamp 26B of power strip 10 and will cause this indicator to display a different color than tracking indicator 122 when controlled device enable indicator 124 is activated. In some embodiments, one or more of indicators 26A-26F will activate or deactivate when a master device connected to a master outlet is in stand-by or power savings mode, or alternatively, indicator 26B may change color or brightness versus its state during normal master device operation, or may blink when the master device is in stand-by mode.

After the power consumption of the master device in power saving mode is defined in the microcontroller system, the microcontroller 118 continues to monitor the SPTE switch 116. By doing this, the microcontroller 118 will know when a user has replaced the connected master and wishes to track the new stand-by power saving power consumption level of the new master. The stored stand-by power reference point of the previous master is replaced by the data measured with regard to the new master after the user initiates the measurement sequence by activating SPTE switch 116.

The microcontroller 118 constantly compares the power consumption of the master with the stored reference stand-by power consumption reference point. If the measured master power consumption is the same as or lower than the stand-by power consumption reference point, then the microcontroller will conclude that the master is in stand-by power saving mode, and will shut down power to the controlled devices.

In some aspects, a separate turn-off set point and turn-on set point is established by the microcontroller 118 at which power may be disrupted or restored to the controlled device outlet or outlets 110, respectively. A higher power level may be used as a power consumption set point for the turn-on set point than for the turn-off set point. A turn-off power consumption set point may be set at the calculated master stand-by power consumption level, or in some aspects, a few percent, such as five percent or more, above or below this level. Similarly, a turn-on power consumption set point may be established a few percent, such as five or ten percent, or in some aspects, up to fifty percent or more above the calculated master stand-by power consumption level. Setting different power levels at which power may be disrupted or restored to the controlled device outlet or outlets facilitates the creation of a hysteresis loop and reduces the potential for the controlled device outlets to be switched on and off repeatedly if the master device goes into stand-by mode. In some aspects, the sensitivity of SSPT 100 may be adjusted by, for example, a potentiometer or a set of potentiometers which may be used by a user to adjust the master device power consumption levels at which SSPT 100 may disrupt and/or restore power to controlled device outlet or outlets 110. In further aspects, a user may set power strip 10 so that power to controlled outlets 12S is not dependent upon the state of a master device that may be connected to master outlet 12M. In even further aspects, controlled power outlets 12S may be set to provide power even in the absence of a master device being connected to master outlet 12M.

In some aspects, microcontroller 118 continuously monitors signals from load current sensor circuit 114 and line voltage sensor circuit 112 and is configured to determine if power consumption levels of master outlet 108 in the active and/or stand-by modes have changed over time. Such a change may result from one master device being exchanged for a different master device. If microcontroller 118 determines that a change in the stand-by power consumption of master outlet 108 has occurred, in some aspects it will automatically initiate a routine to reset the stored reference power consumption threshold point of the master and/or adjust the master power consumption levels at which SSPT 100 may disrupt and/or restore power to controlled device outlet or outlets 110.

In some aspects, power strip 10 and/or SSPT 100 may be included in or used in conjunction with an uninterruptable power supply (UPS) system such as any of the UPS systems supplied by American Power Conversion Corp., of West Kingston, R.I.

Figure 3:
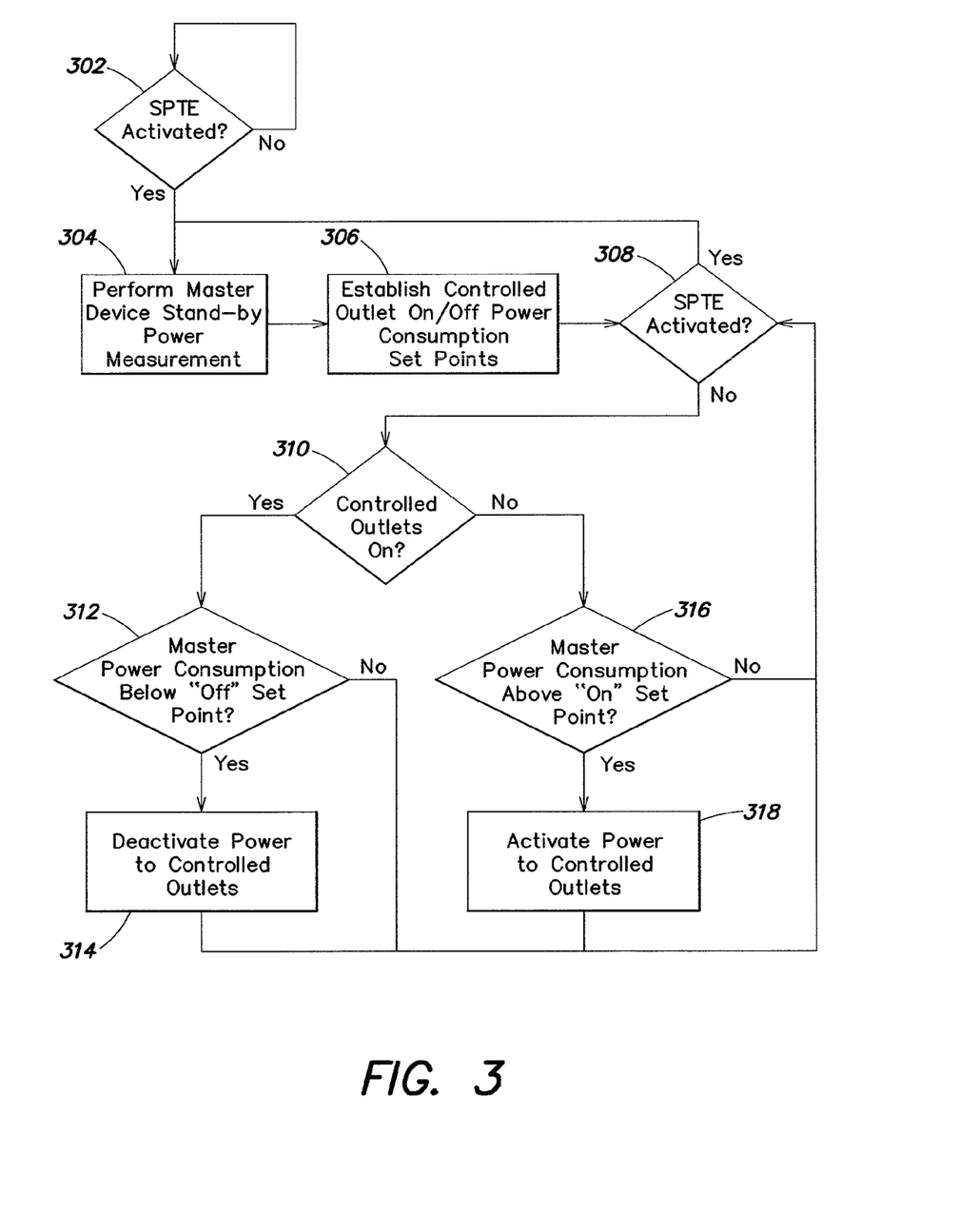
FIG. 3 is a flow chart of a method according to an embodiment of the present invention.

FIG. 3 illustrates a flow chart of the operation of an embodiment of SSPT 100. At stage 302, SSPT 100 has not been initialized and the stand-by power set point of the master power outlet/master device has not yet been defined in the memory of SSPT 100. At this stage, a user may plug a master device into a master device outlet 108 of SSPT 100. Once the master device is connected, the user may put the master device into stand-by mode by waiting or otherwise, and then activate the stand-by power tracking enable switch 116 by, for example, depressing button 28 of power strip 10. At this stage, indicator 26B activates to indicate to a user by blinking on and off that a stand-by power test is being performed. In block 304, the master load current sensor circuit 114 and the line voltage sensor circuit 112 make measurements of the master device current consumption and line voltage at the EMI filter/surge protector, respectively, and send this information to microcontroller 118. Microcontroller 118 performs calculations to determine a master device stand-by power consumption set point. In block 306, master power consumption set points which correspond to controlled device outlet activation and deactivation (on and off set points) are established. As discussed above, the controlled device outlet activation and deactivation power set points are in one embodiment set at the master device stand-by power consumption set point, but in alternate embodiments, may be set at levels above the master device stand-by power consumption set point in such a manner as to limit "chattering" or oscillations between activation and deactivation of the controlled device outlet power enable switch 120 at master device power consumptions at or near the master device stand-by power consumption set point. The master device stand-by power consumption set point is stored in non-volatile memory, such as in an EEPROM associated with SSPT 100. At this point tracking indicator 122, which corresponds to indicator 26B, is switched to a steady illuminated state.

SSPT 100 then checks if SPTE 116 has been activated again (stage 308), and if not, proceeds to check the status of controlled device enable switch 120 to determine if the controlled device outlets are in an activated state (stage 310). If the controlled device outlets are in an activated state, SSPT 100 measures the power consumption of the master outlet, and compares it to the controlled device deactivation (off) power set point (stage 312). If the master power consumption is at or below this set point then SSPT 100 proceeds to block 314 and deactivates the power supply to the controlled device outlets. If the master power consumption is above the controlled device deactivation power set point, no action will be taken and SSPT 100 will return to stage 308 to check if the SPTE has been activated again, and if so, re-perform the acts of blocks 304 and 306.

If in stage 310 the controlled device outlets are determined to be in a deactivated state, SSPT 100 measures the master power consumption and compares it to the controlled device activation (on) power set point (stage 316). If the master power consumption is above this set point then SSPT 100 proceeds to block 318 and activates the power supply to the controlled device outlets. If the master power consumption is below the controlled device activation power set point, no action will be taken and SSPT 100 will return to stage 308 to check if the SPTE has been activated again, and if so, re-perform blocks 304 and 306.

The preceding description of FIG. 3 assumed multiple controlled outlets and a single master outlet, but this process flow is also applicable to aspects of the invention including a single controlled outlet and one or more constant power outlets. Further, in some aspects, SSPT 100 may include multiple master power outlets and the acts of blocks 304 and 306 may be performed for each master outlet to which a master device is connected. Further, at stages 312 and 314, the power consumption of one or more of the connected master devices may be compared against turn on and/or turn off set points established for each connected master device.

In some aspects, SPTE activation monitoring stages 308 and/or 302 may be performed continuously. Also, in some aspects, in block 304 a current level may be measured for a master device in stand-by mode instead of a power level. Similarly, controlled device on/off set points would be set with respect to current delivered to the master device in block 306, and master current draw would be compared to these on/off set points in stages 312 and 316.

In some aspects tracking indicator 122/26B may respond in a different manner than described above when a stand-by power consumption test is initiated or completed. For example, this indicator may change colors during or after a stand-by power consumption test is initiated or completed. Alternatively, indicator 122 may correspond to any one or more of indicators 26A-26F and may blink, turn on or off, or change color in response to a stand-by power consumption test being initiated or completed.

In some alternate aspects the controlled device outlet activation and deactivation set points are also stored in non-volatile memory at stage 306. In some aspects where the controlled device outlet activation and deactivation set points are not stored in non-volatile memory, but where the master device stand-by power consumption set point is, the controlled device outlet activation and deactivation set points are calculated by microcontroller 118 from the master device stand-by power consumption set point as needed.

In further aspects SSPT 100 may have a default stand-by power set point that is utilized prior to initialization or that is used in case of some sort of fault where a defined stand-by power set point is somehow erased or rendered inaccessible.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for controlling application of power to a plurality of devices including a master device and at least one controlled device, the apparatus comprising:
   a power inlet constructed and arranged to receive power from a power source;
   a plurality of power outlets including a master power outlet and at least one controlled power outlet;
   a first circuit adapted to sense a characteristic of power delivered to the master power outlet and to determine if the characteristic of power delivered to the master power outlet has changed;
   a second circuit adapted to automatically initiate setting a first threshold characteristic of a stand-by power consumption level of a device electrically connected to the master power outlet based on the characteristic of the power delivered to the master power outlet sensed by the first circuit and a second threshold characteristic of the stand-by power consumption level of the device electrically connected to the master power outlet in the stand-by mode based on the characteristic of the power delivered to the master power outlet sensed by the first circuit, and to automatically initiate a routine to reset the first and second threshold characteristics of the stand-by power consumption level of the device electrically connected to the master power outlet responsive to the characteristic of power delivered to the master power outlet having changed;
   a third circuit adapted to compare the characteristic of power delivered to the master power outlet sensed by the first circuit with the first threshold characteristic and to compare the characteristic of power delivered to the master power outlet sensed by the first circuit with the second threshold characteristic; and
   a fourth circuit adapted to control a supply of power from the power inlet to the at least one controlled outlet responsive to the comparison performed by the third circuit by removing power to the at least one controlled outlet responsive to the characteristic of power delivered to the master power outlet being at least one of the same as or less than the first threshold characteristic and by providing power to the at least one controlled outlet responsive to the characteristic of power delivered to the master power outlet being greater than the second threshold characteristic.

2. The apparatus of claim 1 wherein the characteristic of power delivered to the master power outlet sensed by the first circuit is current.

3. The apparatus of claim 2, wherein the characteristic of power delivered to the master power outlet sensed by the first circuit further comprises voltage.

4. The apparatus of claim 1 wherein the characteristic of the stand-by power consumption level sensed by the first circuit is total power.

5. The apparatus of claim 1 wherein the characteristic of the stand-by power consumption level sensed by the first circuit is current.

6. The apparatus of claim 1 further comprising a plurality of master power outlets, wherein the first circuit is adapted to sense a characteristic of power delivered to each of the plurality of master power outlets, wherein the second circuit is adapted to determine set a first threshold characteristic and a second threshold characteristic of a stand-by power consumption of devices electrically connected to each of the plurality of master power outlets, wherein the third circuit is adapted to compare the characteristic of power delivered to each of the plurality of master power outlets sensed by the first circuit with the first and second threshold characteristics of the stand-by power consumption determined by the second circuit, and wherein the fourth circuit, is adapted to control the supply of power from the power inlet to the at least one controlled outlet responsive to the comparison performed by the third circuit.

7. The apparatus of claim 1, further comprising a non-volatile memory configured to store a representation first and second threshold characteristics of the stand-by power consumption level.

8. The apparatus of claim 1 further comprising an uninterruptable power supply.

9. The apparatus of claim 1, further comprising a controller and an indicator coupled to the controller and controlled by the controller to provide an indication of a stand-by power consumption level test being performed.

10. The apparatus of claim 1, further comprising a controller and an indicator coupled to the controller and controlled by the controller to provide an indication of a stand-by power consumption level test being completed.

11. The apparatus of claim 1, wherein second threshold characteristic is set at a higher value than the first threshold characteristic.

12. A method of controlling power distribution to a plurality of devices including a master device and at least one controlled device, the master device having at least a first mode of operation and a second mode of operation, with the second mode of operation being a lower power mode of operation than the first mode of operation, the method comprising:
    providing power to the master device through a primary outlet;
    sensing at least one characteristic of the power provided through the primary outlet the master device in the second mode of operation;
    automatically initiating setting a first threshold characteristic of the power provided through the primary outlet based on the sensed characteristic of the power provided through the primary outlet and setting a second threshold characteristic of the power provided through the primary outlet based on the sensed characteristic of the power provided through the primary outlet;
    determining it the at least one characteristic of the power provided through the primary outlet with the master device in the second mode of operation has changed;
    automatically initiating a routine to reset the first threshold characteristic of the power provided through the primary outlet based on the sensed characteristic of the power provided through the primary outlet responsive to determining that the at least one characteristic of the power provided through the primary outlet with the master device in the second mode of operation has changed;
    providing power to the at least one controlled device through a secondary outlet;
    measuring an operating characteristic of power provided through the primary outlet; and
    controlling power to the at least one controlled device responsive to a comparison between the measured operating characteristic of power provided through the primary outlet and the first and second threshold characteristics of the power consumption provided through the primary outlet by removing power to the at least one controlled device responsive to the operating characteristic of power provided through the primary outlet being at least one of the same as or less than the first threshold characteristic and providing power to the at least one controlled device responsive to the operating characteristic of power provided through the primary outlet being greater than the second threshold characteristic.

13. The method of claim 12, wherein sensing the at least one characteristic of power provided through the primary outlet with the master device in the second mode of operation is initiated manually.

14. The method of claim 12, wherein sensing the at least one characteristic of power provided through the primary outlet with the master device in the second mode of operation is initiated automatically.

15. The method of claim 12, further comprising providing an dication that the master device is operating in the second mode of operation.

16. The method of claim 12, further comprising replacing the master device with a second master device, the second master device having at least a first mode of operation and a second mode of operation;
    providing power to the second master device through a primary outlet;
    sensing at least one characteristic of the power provided through the primary outlet with the second master device in the second mode of operation; and
    setting a third threshold characteristic of the power provided through the primary outlet based on the sensed at least one characteristic of the power provided through the primary outlet.

17. The method of claim 16, wherein sensing the at least one characteristic of the power provided through the primary outlet with the second master device in the second mode of operation is initiated manually.

18. The method of claim 16, wherein sensing the at least one characteristic of the power provided through the primary outlet with the second master device in the second mode of operation is initiated automatically.

19. An apparatus for controlling application of power to a plurality of devices including a master device and at least one controlled device, the apparatus comprising:
    a power inlet constructed and arranged to receive power from a power source;
    a plurality of power outlets including a master power outlet and at least one controlled power outlet;
    means for automatically initiating setting a first threshold characteristic of a stand-by power consumption level of a master device electrically connected to the master power outlet based on a characteristic of power delivered to the master power outlet, for automatically initiating setting a second threshold characteristic of a stand-by power consumption level of a master device electrically connected to the master power outlet in a stand-by mode based on a characteristic of power delivered to the master power outlet, for removing power to the at least one controlled power outlet responsive to the characteristic of power delivered to the master device being at least one of the same as or less than the first threshold characteristic, and for providing power to the at least one controlled power outlet responsive to the characteristic of power delivered to the master device being greater than the second threshold characteristic;
    a first circuit adapted to sense the characteristic of power delivered to the master power outlet and to determine if the characteristic of power delivered to the master power outlet has changed; and
    a second circuit adapted to automatically initiate a routine to reset the threshold characteristic of the stand-by power consumption level of the master device electrically connected to the master power outlet responsive to the characteristic of power delivered to the master power outlet having changed.

* * * * *

UNITED STATES PATENT AND TRADEMARK OFFICE
CERTIFICATE OF CORRECTION

PATENT NO. : 9,041,247 B2  
APPLICATION NO. : 13/111173  
DATED : May 26, 2015  
INVENTOR(S) : Marlon Galsim et al.

It is certified that error appears in the above-identified patent and that said Letters Patent is hereby corrected as shown below:

In the Claims:

Column 13, claim 12, line 14, insert --with-- between "outlet" and "the".

Column 13, claim 12, line 24, delete "it" and insert --if--.

Column 14, claim 15, line 2, delete "dication" and insert --indication--.

Signed and Sealed this
Twenty-ninth Day of September, 2015

Michelle K. Lee
*Director of the United States Patent and Trademark Office*